US012608891B2

(12) United States Patent
   Takayama

(10) Patent No.: US 12,608,891 B2
(45) Date of Patent: Apr. 21, 2026

(54) INFORMATION PROCESSING DEVICE, HEAD-MOUNTED DISPLAY DEVICE, CONTROL METHOD OF INFORMATION PROCESSING DEVICE, AND NON-TRANSITORY COMPUTER READABLE MEDIUM WITH WHITE-BALANCE CORRECTION VALUE CORRESPONDING TO COLOR TEMPERATURE OF ENVIRONMENT LIGHT-SOURCE

(71) Applicant: CANON KABUSHIKI KAISHA, Tokyo (JP)

(72) Inventor: Masahiro Takayama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 329 days.

(21) Appl. No.: 18/354,159

(22) Filed: Jul. 18, 2023

(65) Prior Publication Data

US 2024/0037872 A1     Feb. 1, 2024

(30) Foreign Application Priority Data

Jul. 27, 2022     (JP) ................................. 2022-119707

(51) Int. Cl.
   *G06T 19/00*     (2011.01)
   *G06V 10/56*     (2022.01)
   *H04N 9/73*     (2023.01)

(52) U.S. Cl.
   CPC ............ *G06T 19/006* (2013.01); *G06V 10/56* (2022.01); *H04N 9/73* (2013.01)

(58) Field of Classification Search
   CPC ........ G06T 19/006; G06V 10/56; H04N 9/73; H04N 23/88
   See application file for complete search history.

(56) References Cited

U.S. PATENT DOCUMENTS 9,501,870 B2    11/2016   Takayama
9,881,402 B2     1/2018   Sako
2006/0221204 A1 *  10/2006  Ogawa ................. H04N 23/667
                                    348/223.1

FOREIGN PATENT DOCUMENTS

JP          2021056963 A  *  4/2021

* cited by examiner

*Primary Examiner* — Weiming He
(74) *Attorney, Agent, or Firm* — Venable LLP

(57)     ABSTRACT

An information processing device according to the present invention includes at least one memory and at least one processor which function as: an acquisition unit configured to acquire a first white-balance correction value corresponding to a white-balance correction value to be applied to a real-space image; a determination unit configured to determine, on a basis of the first white-balance correction value, a second white-balance correction value that is a white-balance correction value to be applied to a virtual-space image; a correction unit configured to correct the virtual-space image on a basis of the second white-balance correction value; and a superimposing unit configured to superimpose a virtual-space image after correction by the correction unit on the real-space image.

14 Claims, 8 Drawing Sheets

*FIG. 6*

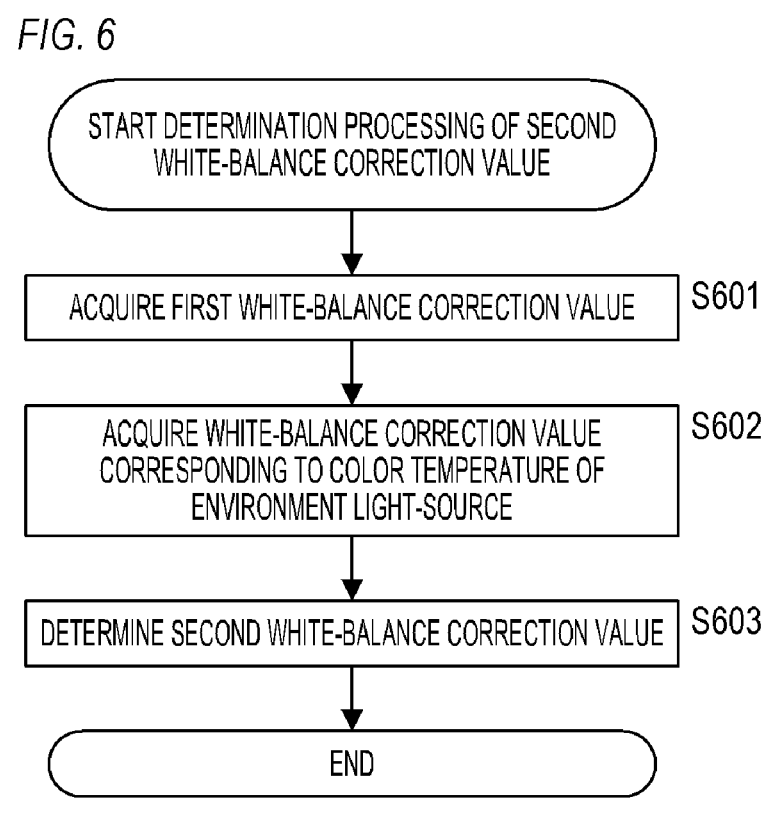

```
┌─────────────────────────────────────┐
│  START DETERMINATION PROCESSING OF   │
│   SECOND WHITE-BALANCE CORRECTION    │
│                VALUE                 │
└─────────────────────────────────────┘
                   │
                   ▼
┌─────────────────────────────────────┐
│ ACQUIRE FIRST WHITE-BALANCE          │  S601
│ CORRECTION VALUE                     │
└─────────────────────────────────────┘
                   │
                   ▼
┌─────────────────────────────────────┐
│ ACQUIRE WHITE-BALANCE CORRECTION     │  S602
│ VALUE CORRESPONDING TO COLOR         │
│ TEMPERATURE OF ENVIRONMENT           │
│ LIGHT-SOURCE                         │
└─────────────────────────────────────┘
                   │
                   ▼
┌─────────────────────────────────────┐
│ DETERMINE SECOND WHITE-BALANCE       │  S603
│ CORRECTION VALUE                     │
└─────────────────────────────────────┘
                   │
                   ▼
┌─────────────────────────────────────┐
│                 END                  │
└─────────────────────────────────────┘
```

*FIG. 8*

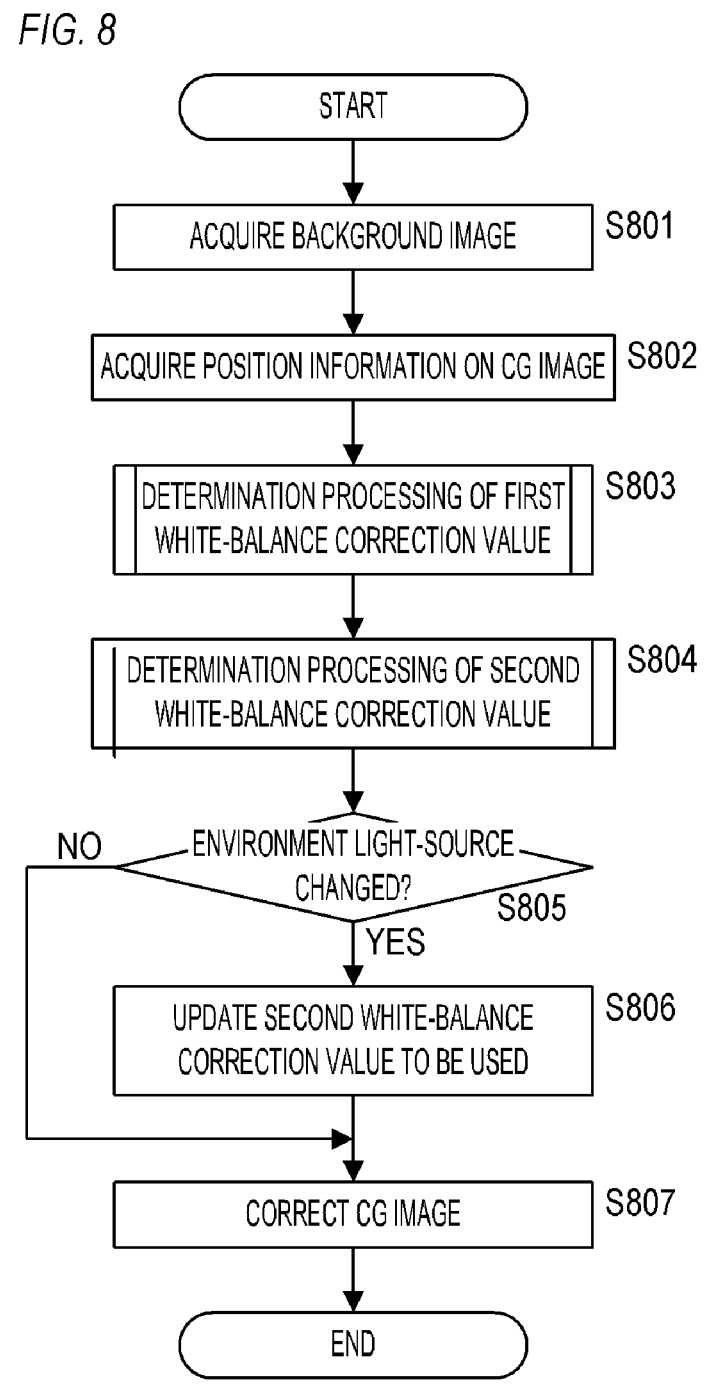

START

↓

ACQUIRE BACKGROUND IMAGE — S801

↓

ACQUIRE POSITION INFORMATION ON CG IMAGE — S802

↓

DETERMINATION PROCESSING OF FIRST WHITE-BALANCE CORRECTION VALUE — S803

↓

DETERMINATION PROCESSING OF SECOND WHITE-BALANCE CORRECTION VALUE — S804

↓

ENVIRONMENT LIGHT-SOURCE CHANGED? — S805

NO →

YES ↓

UPDATE SECOND WHITE-BALANCE CORRECTION VALUE TO BE USED — S806

↓

CORRECT CG IMAGE — S807

↓

END

INFORMATION PROCESSING DEVICE, HEAD-MOUNTED DISPLAY DEVICE, CONTROL METHOD OF INFORMATION PROCESSING DEVICE, AND NON-TRANSITORY COMPUTER READABLE MEDIUM WITH WHITE-BALANCE CORRECTION VALUE CORRESPONDING TO COLOR TEMPERATURE OF ENVIRONMENT LIGHT-SOURCE

BACKGROUND OF THE INVENTION

Field of the Invention

The present invention relates to an information processing device, a head-mounted display device, a control method of an information processing device, and a non-transitory computer-readable medium and, in particular, to a technique to generate a synthesized image of a real-space image and a virtual-space image.

Description of the Related Art

As a technique relating to mixed reality (MR) for the purpose of seamlessly binding a real space and a virtual space together, an MR system using a vide see-through head-mounted display (HMD) has been known. In this MR system, a virtual-space image (computer graphics (CG) image) generated according to the position and orientation of an imaging device is superimposed on a real-space image (background image) captured by the imaging device (for example, a video camera). Then, the HMD displays a synthesized image of the background image and the CG image (an image in which the CG image is superimposed on the background image, i.e., a mixed-reality image).

In an MR system using a video see-through HMD, a synthesized image having a sense of discomfort in appearance is often generated when a CG image is superimposed on a background image as it is. This is because characteristics (image-quality characteristics, for example, gradation characteristics, white balance, noise feelings, or resolution feelings) relating to image quality are different between the background image and the CG image.

For example, if a CG image is superimposed on a background image as it is when the white balance (white reference) of the CG image is different from the white balance of the background image, a synthesized image of a tinge having a sense of discomfort is generated. In order to make the image-quality characteristics of the background image close to the image-quality characteristics of the CG image, it is general to correct the CG image and match the image-quality characteristics of the CG image to the image-quality characteristics of the background image. A technique to reduce a sense of discomfort in a synthesized image is disclosed in Japanese Patent Application Laid-open No. 2021-56963.

In the technique disclosed in Japanese Patent Application Laid-open No. 2021-56963, a white portion of a marker used to estimate the position and orientation of an imaging device is used instead of a reference chart to calculate the correction value of a CG image, and then the CG image is corrected. However, this technique requires the measurement of the color of the white portion of the marker by a colorimeter, and therefore takes labor.

SUMMARY OF THE INVENTION

The present invention provides a technique capable of simply and easily reducing a sense of discomfort in an image in which a virtual-space image is superimposed on a real-space image (without taking labor, for example, without performing special photographing or color measurement).

The present invention in its first aspect provides an information processing device including at least one memory and at least one processor which function as: an acquisition unit configured to acquire a first white-balance correction value corresponding to a white-balance correction value to be applied to a real-space image; a determination unit configured to determine, on a basis of the first white-balance correction value, a second white-balance correction value that is a white-balance correction value to be applied to a virtual-space image; a correction unit configured to correct the virtual-space image on a basis of the second white-balance correction value; and a superimposing unit configured to superimpose a virtual-space image after correction by the correction unit on the real-space image.

The present invention in its second aspect provides a head-mounted display device including: the above described information processing device; and a display configured to display an image obtained by the superimposing unit.

The present invention in its third aspect provides a control method of an information processing device, including: acquiring a first white-balance correction value corresponding to a white-balance correction value to be applied to a real-space image; determining, on a basis of the first white-balance correction value, a second white-balance correction value that is a white-balance correction value to be applied to a virtual-space image; correcting the virtual-space image on a basis of the second white-balance correction value; and superimposing a virtual-space image after correction on the real-space image.

The present invention in its fourth aspect provides a non-transitory computer readable medium that stores a program, wherein the program causes a computer to execute a control method of an information processing device, the control method comprising: acquiring a first white-balance correction value corresponding to a white-balance correction value to be applied to a real-space image; determining, on a basis of the first white-balance correction value, a second white-balance correction value that is a white-balance correction value to be applied to a virtual-space image; correcting the virtual-space image on a basis of the second white-balance correction value; and superimposing a virtual-space image after correction on the real-space image.

Further features of the present invention will become apparent from the following description of exemplary embodiments with reference to the attached drawings.

BRIEF DESCRIPTION OF THE DRAWINGS

FIG. 6 is a flowchart showing the determination processing of a second white-balance correction value;

FIG. 8 is a flowchart in a second embodiment; and

DESCRIPTION OF THE EMBODIMENTS

Hereinafter, embodiments of the present invention will be described in detail on the basis of the accompanying drawings.

First Embodiment

Figure 1:
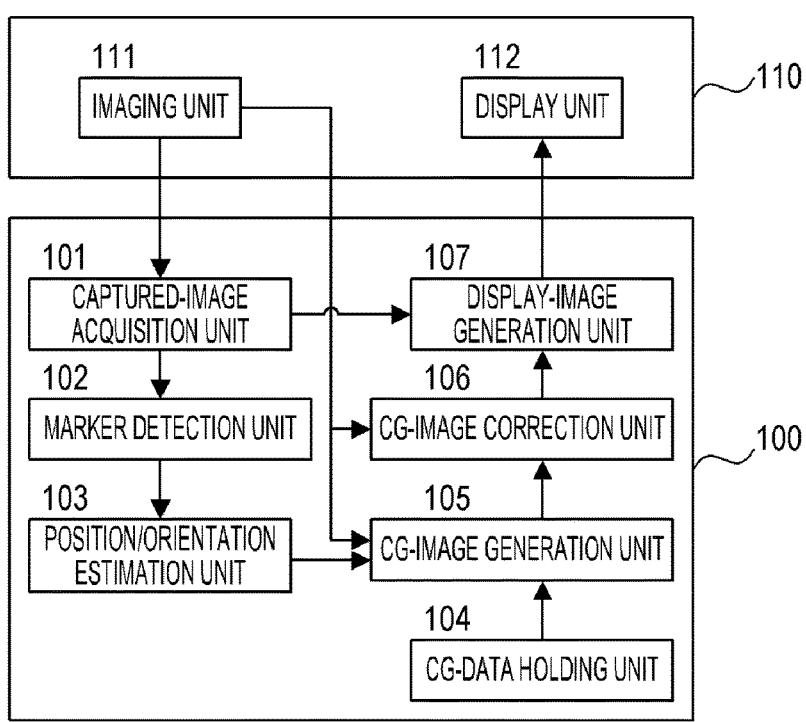
FIG. 1 is a block diagram showing the configuration of an MR system.

A first embodiment of the present invention will be described. FIG. 1 is a block diagram showing the configuration of a mixed-reality (MR) system serving as an information processing system in the first embodiment. The MR system shown in FIG. 1 is an MR system using a video see-through head-mounted display (HMD). In the MR system shown in FIG. 1, a virtual-space image generated according to the position and orientation of an imaging device is superimposed on a real-space image captured by the imaging device (for example, a video camera). Then, the HMD displays a synthesized image of the real-space image and the virtual-space image (an image in which the virtual-space image is superimposed on the real-space image, i.e., a mixed-reality image). The real-space image is an image showing a real space, and the virtual-space image is an image showing a virtual space. Hereinafter, a real-space image will be described as a background image, and a virtual-space image will be described as a computer-graphics (CG) image.

Here, if a CG image is directly superimposed on a background image as it is when the white balance (white reference) of the CG image is different from the white balance of the background image, a synthesized image of a tinge having a sense of discomfort is generated. As a technique to reduce such a sense of discomfort, a technique to use a white portion of a marker used to estimate the position and orientation of an imaging device instead of a reference chart to correct a CG image has been proposed. However, this technique requires the measurement of the color of the white portion of the marker by a colorimeter, and therefore takes labor. In view of this, a sense of discomfort in a synthesized image is simply and easily reduced (without taking labor, for example, without performing special photographing or color measurement) in the first embodiment.

As shown in FIG. 1, the MR system in the first embodiment has an information processing device 100 and a head-mounted display device (HMD) 110. Note that the configuration shown in FIG. 1 is an example. For example, a part or all of the functions of the information processing device 100 may be included in the HMD 110.

The HMD 110 is a video see-through HMD, and has an imaging unit 111 and a display unit 112. The imaging unit 111 captures a real space to acquire a background image, and transmits the background image (data on the background image) to the information processing device 100. The transmission of the background image from the imaging unit 111 to the information processing device 100 may be performed via wired communication or wireless communication. The display unit 112 displays an image. For example, the display unit 112 displays a display image received from the information processing device 100.

Figure 2:
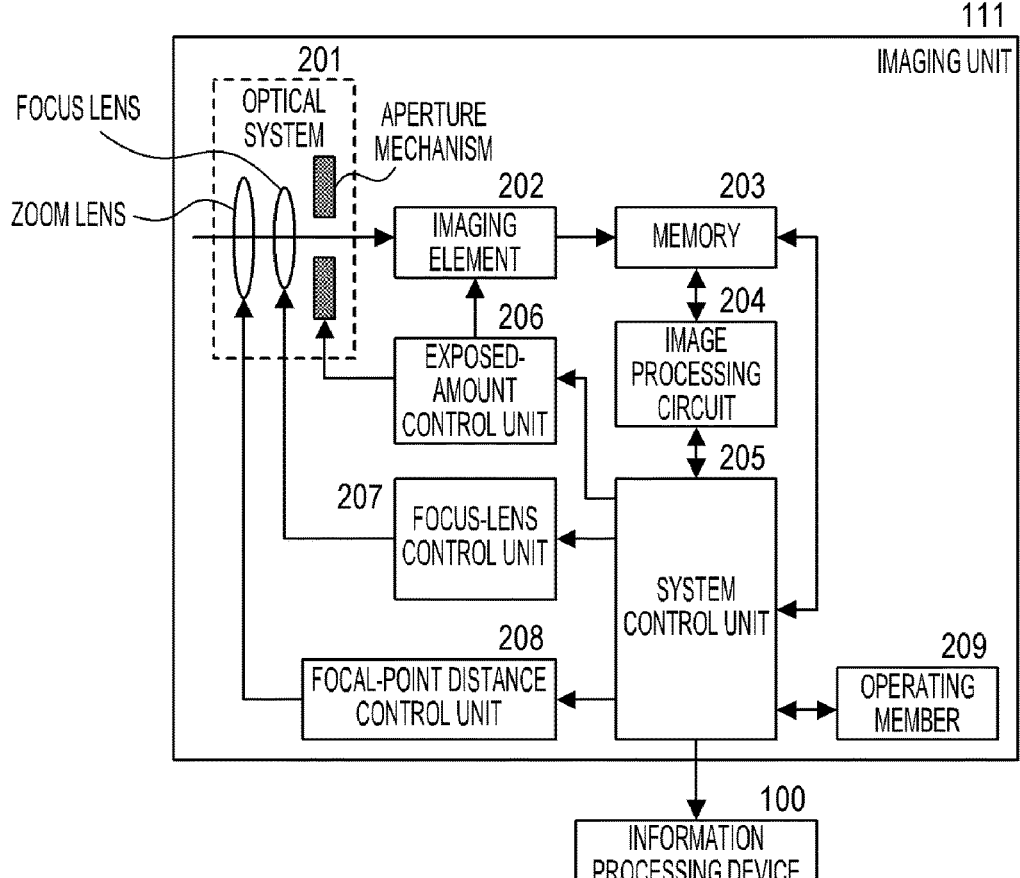
FIG. 2 is a block diagram showing the configuration of an imaging unit.

FIG. 2 is a block diagram showing the configuration of the imaging unit 111.

An optical system 201 is an optical system including a plurality of lenses and an aperture mechanism. For example, the optical system 201 includes a focus lens for focusing, a zoom lens for zooming, and an aperture mechanism.

An imaging element 202 is an imaging sensor (for example, a CCD or CMOS), and includes an A/D converter that converts an analog signal into a digital signal. The imaging element 202 has, for example, an RGB color filter in Bayer arrangement on its surface, and is capable of performing color photographing. When an object image is formed on the imaging surface of the imaging element 202, the imaging element 202 generates and outputs image data (image signal). The image data output from the imaging element 202 is stored in a memory 203.

The memory 203 is enabled to retain various data. For example, the memory 203 is enabled to retain image data output from the imaging element 202, or enabled to retain data necessary for the entire processing of the imaging unit 111.

An image processing circuit 204 performs various image processing on image data output from the A/D converter of the imaging element 202 or image data output from the memory 203. For example, the image processing circuit 204 performs pixel interpolation processing, white-balance processing, γ-correction, noise-reduction processing, edge enhancement processing, contrast adjustment processing, or synthetic processing.

A system control unit 205 controls the entire imaging unit 111. For example, the image processing circuit 204 performs predetermined evaluation-value calculation processing using image data captured by the imaging element 202, and the system control unit 205 performs exposure control and ranging control on the basis of an obtained evaluation value. Thus, the auto focus (AF) processing, automatic exposure (AE) processing, and automatic white-balance (AWB) processing of a through-the-lens (TTL) system are performed. Further, the system control unit 205 issues instructions to control a shutter speed, the aperture mechanism, the focus lens, and the zoom lens in order to perform photographing under photographing conditions determined by the image processing circuit 204. In the first embodiment, the system control unit 205 issues instructions to an exposure-amount control unit 206, a focus-lens control unit 207, and a focal-point distance control unit 208. Further, the system control unit 205 transmits a background image captured by the imaging unit 111 (a background image after AWB processing) to a captured-image acquisition unit 101 of the information processing device 100. In addition, the system control unit 205 transmits a background image (background image before AWB processing) captured by the imaging element 202 to a CG-image correction unit 106 of the information processing device 100.

The exposure-amount control unit 206 adjusts the aperture mechanism of the optical system 201, the exposure time of the imaging element 202, and imaging sensitivity (i.e., ISO sensitivity) to perform proper exposure-amount control.

The focus-lens control unit 207 controls the focus lens of the optical system 201.

The focal-point distance control unit 208 changes a focal-point distance by controlling the zoom lens of the optical system 201 according to instructions from the system control unit 205.

An operating member 209 is a button or touch panel, and receives various user operations (for example, photographing instructions or instructions to change the settings of image processing). The system control unit 205 determines or changes the operation of the imaging unit 111 according to user operations received by the operating member 209. The touch panel may be integrally provided with respect to the display unit 112.

In FIG. 1, the information processing device 100 has the captured-image acquisition unit 101, a marker detection unit 102, a position/orientation estimation unit 103, a CG-data holding unit 104, a CG-image generation unit 105, the CG-image correction unit 106, and a display-image generation unit 107.

The captured-image acquisition unit 101 acquires a background image (background image after AWB processing) captured by the imaging unit 111 of the HMD 110, and transmits the acquired background image to the marker detection unit 102 and the display-image generation unit 107.

The marker detection unit 102 specifies an area, at which a marker (for example, a two-dimensional code) used to estimate the position and orientation of the HMD 110 serving as an imaging device is reflected, from an acquired background image (background image after AWB processing). The marker detection unit 102 transmits information (i.e., marker-area information) showing the position and direction of the detected marker to the position/orientation estimation unit 103 together with the acquired background image.

The position/orientation estimation unit 103 estimates the position and orientation of the HMD 110 on the basis of marker-area information and a background image acquired from the marker detection unit 102. Various research reports have been made as methods for estimating the position and orientation, and any of the methods may be used. Further, in order to increase accuracy in estimating the position and orientation, various sensors (for example, a magnetic sensor or an optical sensor) may be used. The position/orientation estimation unit 103 transmits position/orientation information (estimation results of the position and orientation) to the CG-image generation unit 105.

The CG-image generation unit 105 acquires position/orientation information from the position/orientation estimation unit 103 and CG data from the CG-data holding unit 104. Then, the CG-image generation unit 105 performs various processing (for example, movement, rotation, or enlargement/reduction) on the CG data on the basis of the position/orientation information to generate a CG image that is a virtual-space image to be superimposed on a background image. This CG image corresponds to a view from the HMD 110. The CG-image generation unit 105 may further use information on the imaging principal-point position and focal-point distance of the imaging unit 111 in the generation processing of the CG image. The CG-image generation unit 105 reads the information on the imaging principal-point position and focal-point information from, for example, the memory 203 via the system control unit 205 of the imaging unit 111. The CG-image generation unit 105 transmits the generated CG image to the CG-image correction unit 106.

The CG-image correction unit 106 performs white-balance correction on a CG image acquired from the CG-image generation unit 105 on the basis of a background image (background image before AWB processing) acquired from the system control unit 205 of the imaging unit 111. In the MR system of the first embodiment, the white balance of a CG image is corrected so as to match the white balance of a background image (background image after AWB processing) by the white-balance correction of the CG-image correction unit 106. Thus, a sense of discomfort in a synthesized image of the background image and the CG image (an image in which the CG image is superimposed on the background image, i.e., a mixed-reality image) is reduced. The CG-image correction unit 106 transmits the CG image after the white-balance correction to the display-image generation unit 107.

The display-image generation unit 107 acquires a background image (background image after AWB processing) from the captured-image acquisition unit 101 and a CG image (CG image after white-balance correction) from the CG-image correction unit 106. Then, the display-image generation unit 107 superimposes the acquired CG image on the acquired background image to generate a synthesized image (mixed-reality image) composed of the background image and the CG image as a display image. The display-image generation unit 107 transmits the generated display image to the display unit 112 of the HMD 110.

Figure 3:
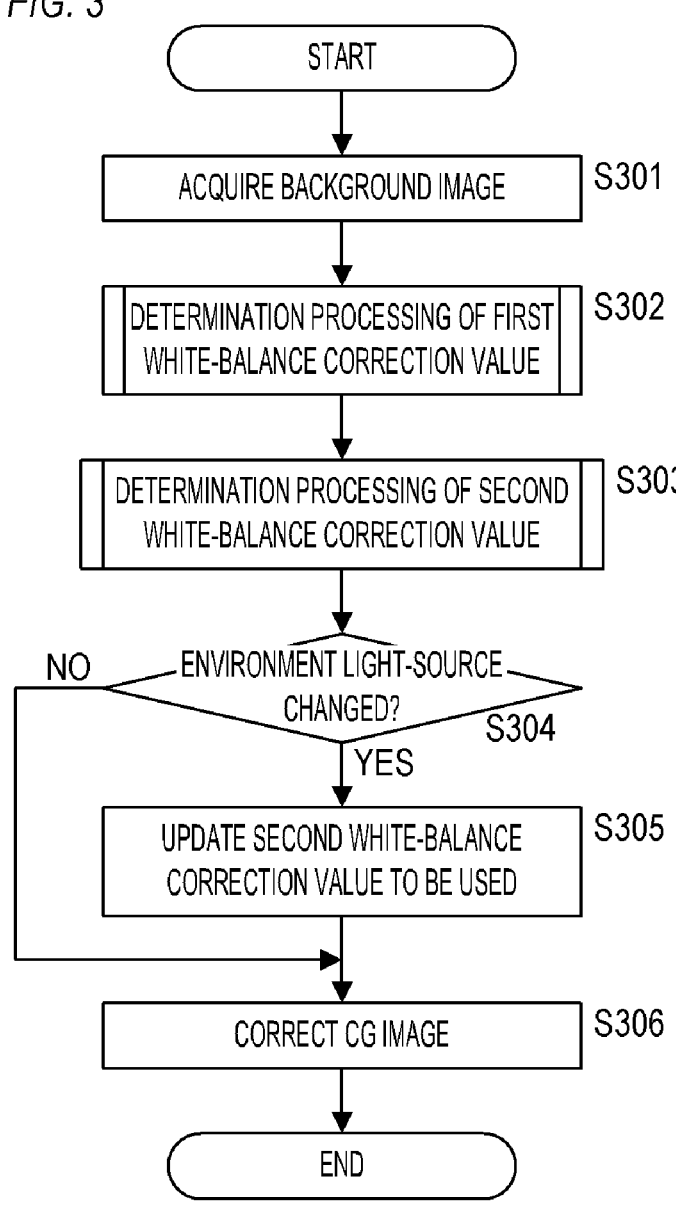
FIG. 3 is a flowchart in a first embodiment.

FIG. 3 is a flowchart showing the processing flow of the CG-image correction unit 106.

In step S301, the CG-image correction unit 106 acquires a background image (background image before AWB processing) captured by the imaging element 202 from the system control unit 205 of the imaging unit 111.

In step S302, the CG-image correction unit 106 determines (acquires) a first white-balance correction value on the basis of the background image (background image before the AWB processing) acquired in step S301. The first white-balance correction value corresponds (approximates) to a white-balance correction value (white-balance value used in the AWB processing) applied to a background image (background image after the AWB processing) acquired by the captured-image acquisition unit 101. Here, "approximate" includes "match".

Figure 4:
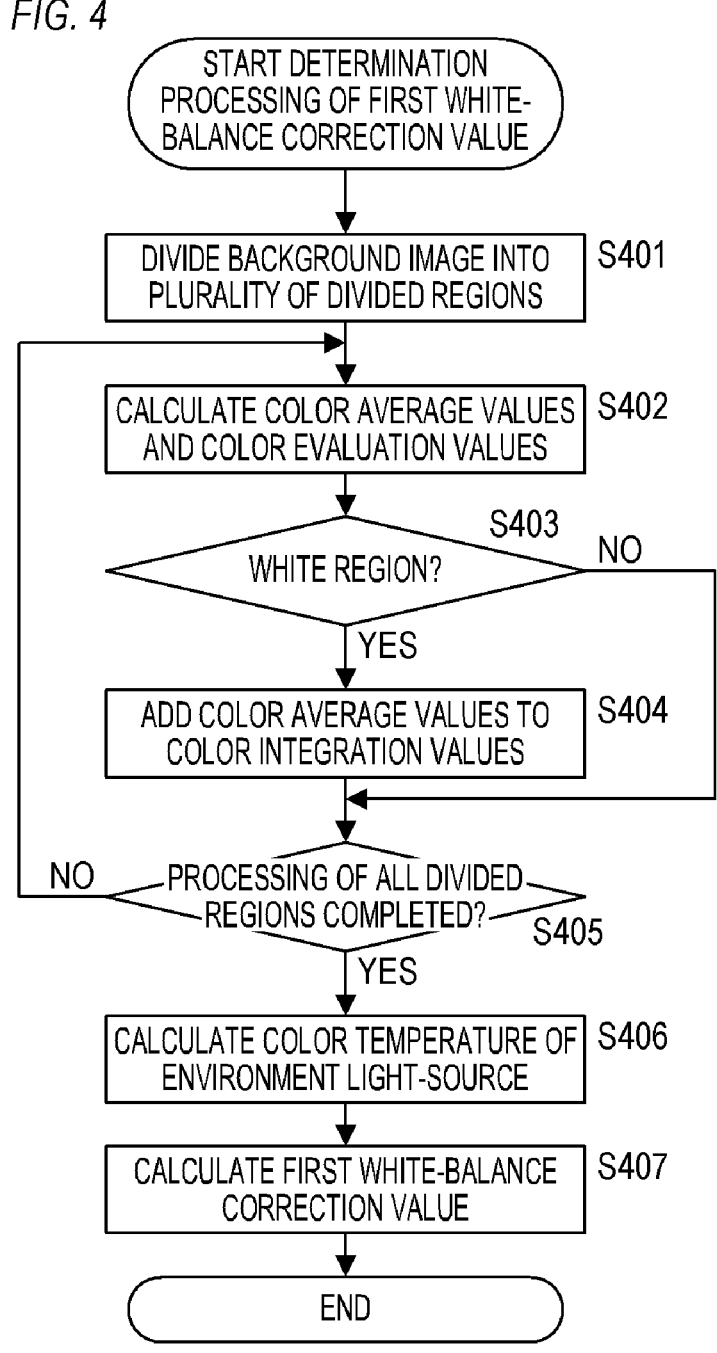
FIG. 4 is a flowchart showing the determination processing of a first white-balance correction value.

FIG. 4 is a flowchart showing the determination processing of a first white-balance correction value (the processing of step S302).

In step S401, the CG-image correction unit 106 divides a background image (background image before AWB processing) acquired in step S301 of FIG. 3 into a plurality of divided regions.

In step S402, the CG-image correction unit 106 selects any one of the plurality of divided regions, and calculates the color average values (the R average value R[i] of R values, the G average value G[i] of G values, and the B average value B[i] of B values) of a target region that is the selected divided region. Then, the CG-image correction unit 106 calculates the color evaluation values Cx[i] and Cy[i] of the target region using the following Formulae 1-1 to 1-3. [i] represents a state in which a value corresponds to the i-th divided region.

$$Cx[i] = (R[i] - B[i])/Y[i] \times 1024 \qquad \text{Formula 1-1}$$

$$Cy[i] = (R[i] + B[i] - 2 \times G[i])/Y[i] \times 1024 \qquad \text{Formula 1-2}$$

$$Y[i] = (R[i] + 2 \times G[i] + B[i])/4 \qquad \text{Formula 1-3}$$

Figure 5A:
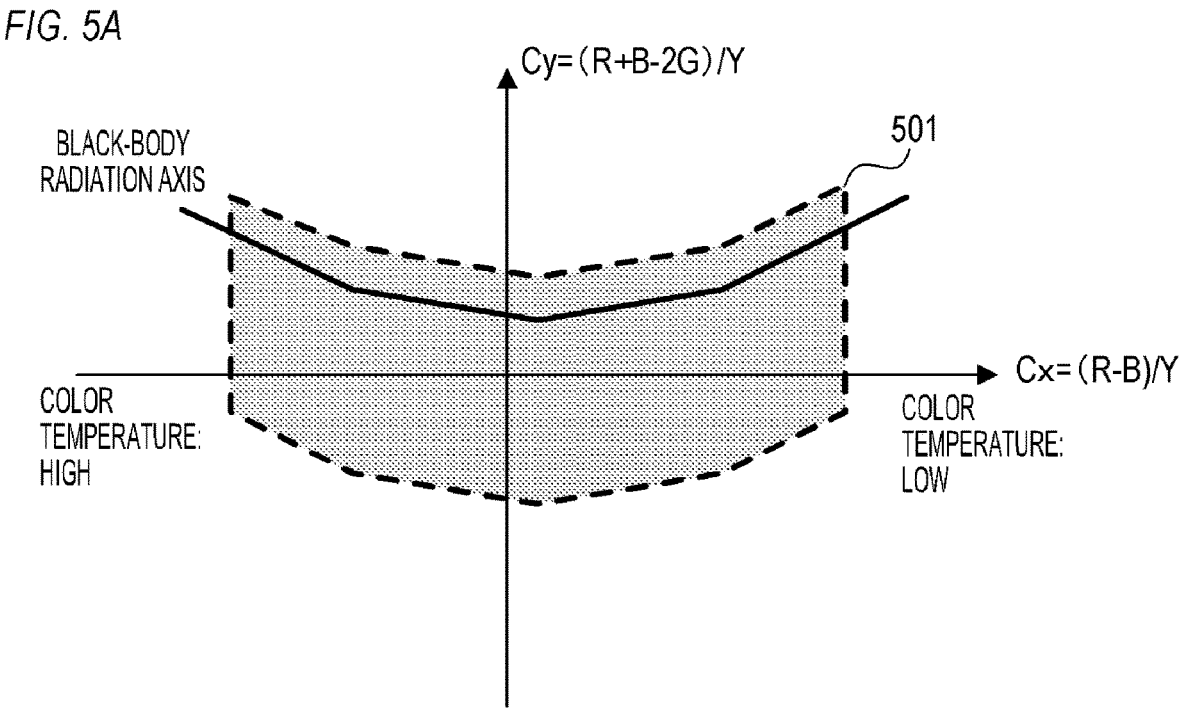
FIG. 5A is a graph showing a white detection range.

In step S403, the CG-image correction unit 106 determines whether the target region is a white region (region in which a white object was captured). For example, the CG-image correction unit 106 determines whether coordinates corresponding to the color evaluation values Cx[i] and Cy[i] of the target region are included in a white detection range 501 in the graph of FIG. 5A. When determining that the coordinates corresponding to the color evaluation values Cx[i] and Cy[i] of the target region are included in the white detection range 501, the CG-image correction unit 106 determines that the target region is the white region and advances the processing to step S404. When determining that the coordinates corresponding to the color evaluation values Cx[i] and Cy[i] of the target region are not included in the white detection range 501, the CG-image correction unit 106 determines that the target region is not the white region and advances the processing to step S405. In FIG. 5A, a horizontal axis shows a color evaluation value Cx, and shows the color temperature of an environment light-source (light source in an imaging environment). The higher the temperature of the environment light-source, the smaller the color evaluation value Cx is. In FIG. 5A, a vertical axis shows the color evaluation value Cy, and shows the strength of the green component of the environment light-source. The stronger the green component of the environment light-source, the smaller the color evaluation value Cy is. For example, the color evaluation value Cy is small when the environment light-source is a fluorescent light.

The white detection range 501 is the coordinates range of the color evaluation values Cx and Cy calculated in the white region. For example, a white object is captured under each of a plurality of environment light sources, color evaluation values Cx and Cy are calculated, and the coordinates of the calculated color evaluation values Cx and Cy are plotted into the graph of FIG. 5A. Then, a range including the plotted coordinates (for example, a minimum range including the plotted coordinates) may be determined as the white detection range 501 in advance. A white detection range may be determined for each photographing mode.

In step S404, the CG-image correction unit 106 adds color average values to color integration values. For example, the CG-image correction unit 106 adds the R average value R[i] to an R integration value SumR, adds the G average value G[i] to a G integration value SumG, and adds the B average value B[i] to a B integration value SumB.

The processing of steps S403 and S404 may be expressed by the following Formulae 2-1 to 2-3. A variable Sw[i] becomes 1 when the target region is the white region, and becomes 0 when the target region is not the white region.

$$\mathrm{Sum}R=\Sigma(Sw[i]\times R[i]) \qquad \text{Formula 2-1}$$

$$\mathrm{Sum}G=\Sigma(Sw[i]\times G[i]) \qquad \text{Formula 2-2}$$

$$\mathrm{Sum}B=\Sigma(Sw[i]\times B[i]) \qquad \text{Formula 2-3}$$

In step S405, the CG-image correction unit 106 determines whether the processing of steps S402 to S404 has been performed on all the divided regions. When determining that the processing of steps S402 to S404 has not been performed on any of the divided regions, the CG-image correction unit 106 returns the processing to step S402. Then, when determining that the processing of steps S402 to S404 has been performed on all the divided regions, the CG-image correction unit 106 advances the processing to step S406.

In step S406, the CG-image correction unit 106 calculates the color temperature of the environment light-source corresponding to the background image on the basis of the ratio (color ratio) of the R integration value SumR, the G integration value SumG, and the B integration value SumB. Then, the CG-image correction unit 106 calculates (determines) a white-balance correction value WBCo0 corresponding to the calculated color temperature using the following Formulae 3-1 to 3-4. The white-balance correction value WBCo0 corresponds to a white-balance correction value for displaying a white (predetermined-color) object in white (a predetermined color). The white-balance correction value WBCo0 includes an R correction value WBCo0_R for correcting an R value, a G correction value WBCo0_G for correcting a G value, and a B correction value WBCo0_B for correcting a B value.

$$WBCo0\_R=\mathrm{Sum}Y\times1024/\mathrm{Sum}R \qquad \text{Formula 3-1}$$

$$WBCo0\_G=\mathrm{Sum}Y\times1024/\mathrm{Sum}G \qquad \text{Formula 3-2}$$

$$WBCo0\_B=\mathrm{Sum}Y\times1024/\mathrm{Sum}B \qquad \text{Formula 3-3}$$

$$\mathrm{Sum}Y=(\mathrm{Sum}R+2\times\mathrm{Sum}G+\mathrm{Sum}B)/4 \qquad \text{Formula 3-4}$$

In step S407, the CG-image correction unit 106 adjusts the white-balance correction value WBCo0 corresponding to the color temperature on the basis of the color temperature calculated in step S406 to calculate (determine) a first white-balance correction value WBCo1.

A color (perception color) perceived when a human sees an object with his/her eye depends on the color temperature of an environment light-source. For example, under an artificial sunlight source having a color temperature of 5000 K, a perception color perceived when a human sees a white object becomes white. However, under an electric bulb-color light-source having a color temperature of 3000 K, a perception color perceived when a human sees a white object with his/her eye becomes a slightly reddish color. If a white object is displayed in white under the electric bulb-color light-source having a color temperature of 3000 K, an atmosphere is spoiled due to a deviation from a color perceived by a human. Therefore, in AWB processing, processing to make an atmosphere and a tinge under an environment light-source remain unchanged is often performed. The processing of step S407 is performed in consideration of such processing.

Figure 5B:
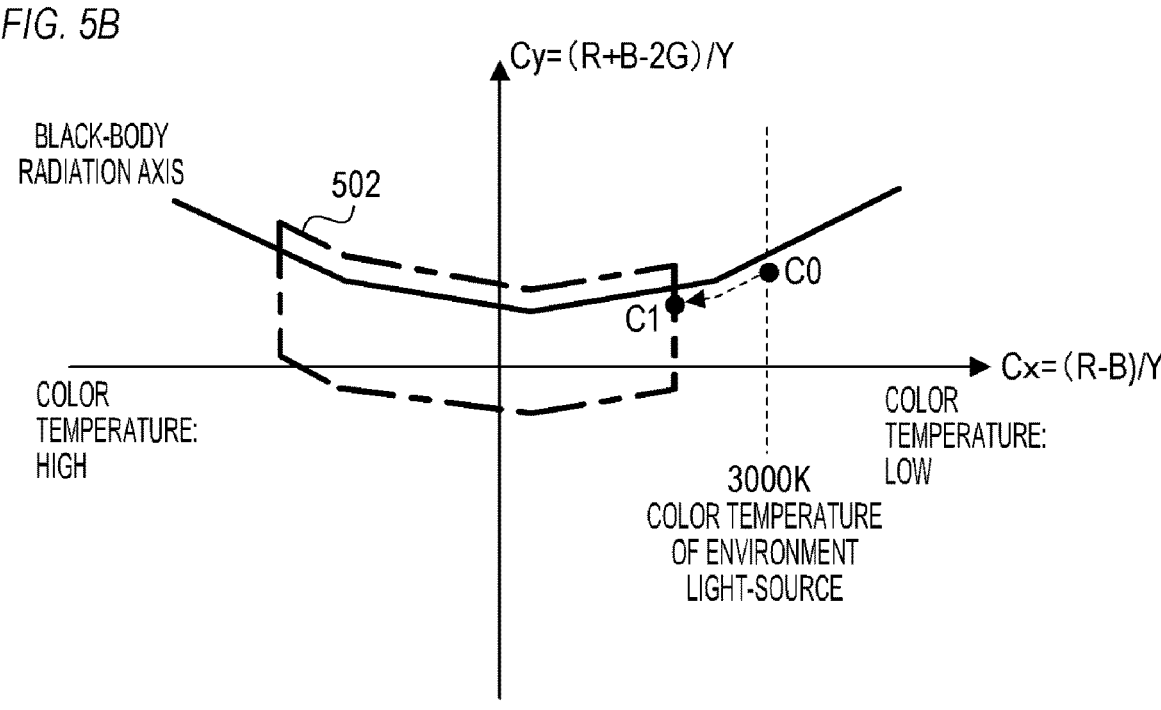
FIG. 5B is a graph showing a WB control range.

Here, it is assumed that the color temperature calculated in step S406 is 3000 K (coordinates C0 in FIG. 5B). In this case, for example, the CG-image correction unit 106 adjusts the color temperature so that the coordinates C0 shift to coordinates C1 inside a predetermined WB control range 502. When the environment light-source is a sunlight source, a white fluorescent light, or a white LED light-source, the color temperature is not adjusted. When the environment light-source is a low color-temperature light-source (for example, an electric bulb-color light-source), the color temperature is adjusted so as to obtain a display color in which a reddish color remains. When the environment light-source is a high color-temperature light-source (for example, when a photographing scene is a scene in the shade), the color temperature is adjusted so as to obtain a display color in which a bluish color remains. The CG-image correction unit 106 calculates, using the following Formulae 4-1 to 4-4 like Formulae 3-1 to 3-4, a first white-balance correction value WBCo1 from a color ratio (an R integration value SumR', a G integration value SumG', and a B integration value SumB') after the adjustment of the color temperature. The first white-balance correction value WBCo1 corresponds to a white-balance correction value for displaying an object in a color perceived by a human. The first white-balance correction value WBCo1 includes an R correction value WBCo1_R for correcting an R value, a G correction value WBCo1_G for correcting a G value, and a B correction value WBCo1_B for correcting a B value.

$$WBCo1\_R=\mathrm{Sum}Y'\times1024/\mathrm{Sum}R' \qquad \text{Formula 4-1}$$

$$WBCo1\_G=\mathrm{Sum}Y'\times1024/\mathrm{Sum}G' \qquad \text{Formula 4-2}$$

$$WBCo1\_B=\mathrm{Sum}Y'\times1024/\mathrm{Sum}B' \qquad \text{Formula 4-3}$$

$$\mathrm{Sum}Y'=(\mathrm{Sum}R'+2\times\mathrm{Sum}G'+\mathrm{Sum}B')/4 \qquad \text{Formula 4-4}$$

The description of FIG. 3 will be resumed. In step S303, the CG-image correction unit 106 determines, on the basis of the first white-balance correction value WBCo1 determined (calculated) in step S302, a second white-balance correction value that is a white-balance correction value to be applied to a CG image.

FIG. 6 is a flowchart showing the determination processing (the processing of step S303) of a second white-balance correction value. In the determination processing of FIG. 6, a second white-balance correction value is determined on the basis of a first white-balance correction value WBCo1 and the color temperature of an environment light-source estimated in the determination process of the first white-balance correction value WBCo1.

In step S601, the CG-image correction unit 106 acquires a first white-balance correction value WBCo1 (an R correction value WBCo1_R, a G correction value WBCo1_G, and a B correction value WBCo1_B) calculated in step S302 of FIG. 3 (step S407 of FIG. 4).

In step S602, the CG-image correction unit 106 acquires a white-balance correction value WBCo0 (an R correction value WBCo0_R, a G correction value WBCo0_G, and a B correction value WBCo0_B) calculated in step S406 of FIG. 4. The white balance correction value WBCo0 corresponds to the color temperature of the environment light-source estimated in the determination process of the first white-balance correction value WBCo1.

In step S603, the CG-image correction unit 106 determines a second white-balance correction value WBCo2 on the basis of the first white-balance correction value WBCo1 acquired in step S601 and the white-balance correction value WBCo0 acquired in step S602. For example, the CG-image correction unit 106 calculates the second white-balance correction value WBCo2 using the following Formulae 5-1 to 5-3. The second white-balance correction value WBCo2 includes an R correction value WBCo2_R for correcting an R value, a G correction value WBCo2_G for correcting a G value, and a B correction value WBCo2_B for correcting a B value. A constant $\alpha$ is a predetermined normalization coefficient.

$$WBCo2\_R = \alpha \times WBCo1\_R / WBCo0\_R \qquad \text{Formula 5-1}$$

$$WBCo2\_G = \alpha \times WBCo1\_G / WBCo0\_G \qquad \text{Formula 5-2}$$

$$WBCo2\_B = \alpha \times WBCo1\_B / WBCo0\_B \qquad \text{Formula 5-3}$$

The description of FIG. 3 will be resumed. In step S304, the CG-image correction unit 106 determines whether a photographing environment (an environment in a real space, a photographing scene) has changed. A method for determining whether the photographing environment has changed is not particularly limited. For example, the CG-image correction unit 106 determines whether the photographing environment has changed on the basis of the fluctuation amount of an exposure condition or the fluctuation amount of the color-ratio statistical amount of a background image. The CG-image correction unit 106 advances the processing to step S305 when determining that the photographing environment has changed. When determining that the photographing environment has not changed, the CG-image correction unit 106 advances the processing to step S306 without performing the processing of step S305.

In step S305, the CG-image correction unit 106 updates the second white-balance correction value WBCo2 to be used in white-balance correction. The CG-image correction unit 106 also updates the first white-balance correction value WBCo1 so as to correspond to the updated second white-balance correction value WBCo2.

As described above, a second white-balance correction value WBCo2 to be used in white balance correction is updated on the basis of whether a photographing environment has changed in the first embodiment.

In AWB processing, the calculation of a white-balance correction value is performed at a predetermined cycle (for example, the calculation is performed once for a plurality of frames of a background image), and the white-balance correction value is applied to (reflected in) the respective frames of the background image. Further, when slight panning has been performed or when a slight change has occurred in an object, a calculated white-balance correction value may change although a photographing environment has not changed. When such a change in the white-balance correction value is reflected in a background image, the background image becomes a bad-looking image since a tinge frequently fluctuates. Therefore, in the AWB processing, a white-balance correction value to be applied to a background image is not updated when a photographing environment has not changed and is updated when the photographing environment has changed in many cases. The processing of steps S304 and S305 is performed in consideration of such processing.

For example, in the AWB processing, a white-balance correction value to be applied to a background image is gradually changed during its update. Thus, it is possible to suppress a fluctuation in a tinge. Accordingly, when updating a second white-balance correction value WBCo2 to be used in white-balance correction, the CG-image correction unit 106 gradually updates the second white-balance correction value WBCo2.

Figure 7:
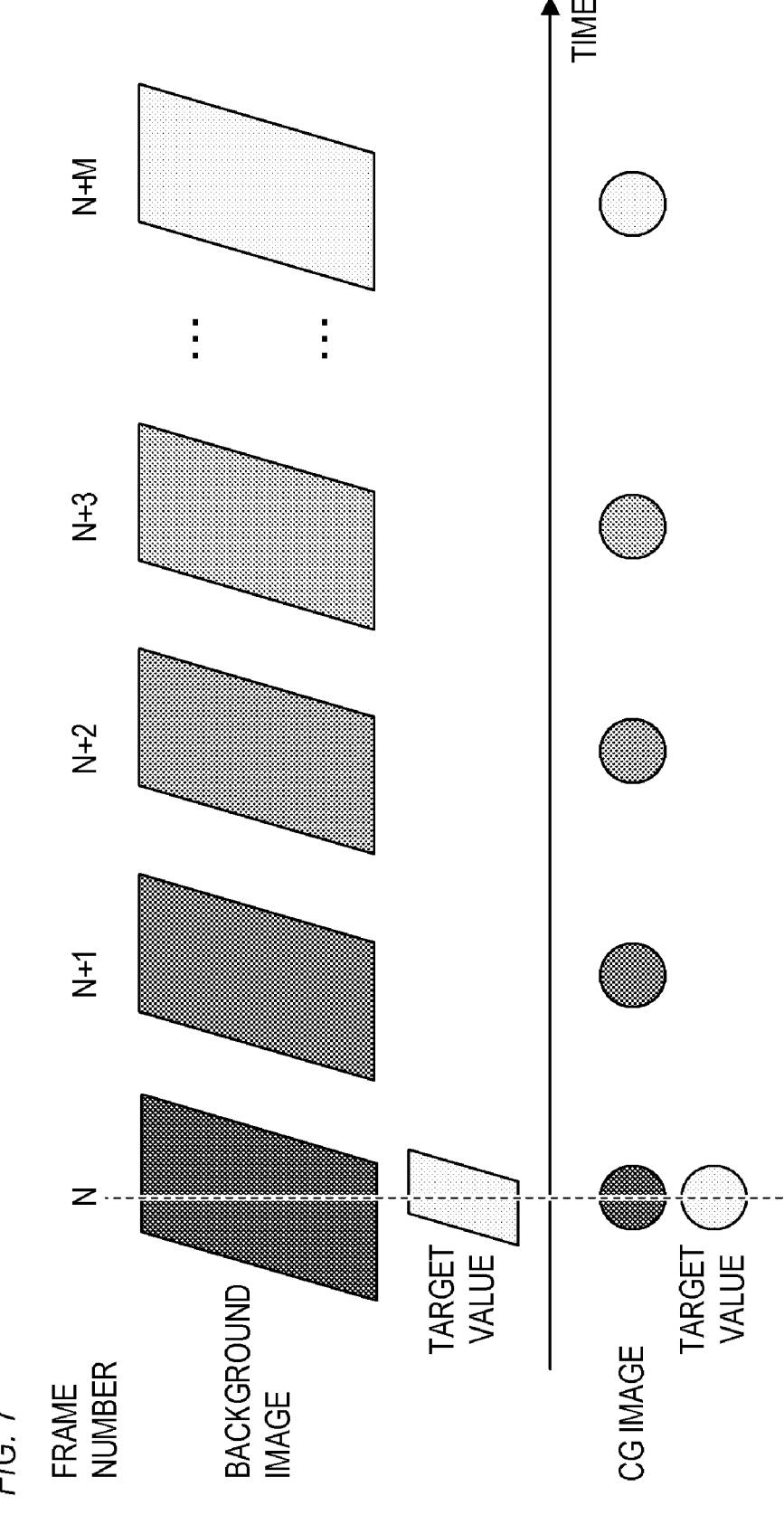
FIG. 7 is a diagram showing a state in which a white-balance correction value is updated.

The update of a white-balance correction value will be described in detail using FIG. 7. FIG. 7 shows a state in which a white-balance correction value is updated. In FIG. 7, a photographing environment has changed at the timing of the N-th frame of a background image. At the timing of the N-th frame of the background image, a white-balance correction value calculated at this timing is set as a target value. Then, a white-balance correction value to be applied to the background image is gradually changed from a current white-balance correction value to the target value. For example, processing to change the white-balance correction value by a predetermined amount (for example, 1[Mired]) between frames is repeatedly performed. In the example of FIG. 7, the white-balance correction value to be applied to the background image reaches the target value at the timing of the N+M-th frame.

Similarly, at the timing of the N-th frame of a background image, the CG-image correction unit 106 sets a second white-balance correction value WBCo2 calculated at this timing as a target value. Then, the CG-image correction unit 106 gradually changes the second white-balance correction value WBCo2 to be applied to a CG image from a current second white-balance correction value WBCo2 to the target value. In the example of FIG. 7, the second white-balance correction value WBCo2 to be applied to the CG image reaches the target value at the timing of the N+M-th frame.

Note that a white-balance correction value to be applied to a background image may be gradually changed from a current white-balance correction value to a target value over a predetermined time. In this case, the CG-image correction unit 106 gradually changes a second white-balance correction value WBCo2 to be applied to a CG image from a current second white-balance correction value WBCo2 to a target value over a predetermined time.

The description of FIG. 3 will be resumed. In step S306, the CG-image correction unit 106 corrects a CG image acquired from the CG-image generation unit 105 on the basis of the second white-balance correction value WBCo2 (white-balance correction). For example, the CG-image correction unit 106 multiplies the R value of the CG image by an R correction value WBCo2_R, multiplies the G value of the GC image by a G correction value WBCo2_G, and multiplies the B value of the CG image by a B correction value WBCo2_B. Note that the second white-balance correction value WBCo2 is not limited to a gain value but may include an offset value.

As described above, a first white-balance correction value corresponding to a white-balance correction value applied to a background image is acquired according to the first embodiment. Then, a second white-balance correction value that is a white-balance correction value to be applied to a CG image is determined on the basis of the first white-balance correction value. Thus, it is possible to simply and easily reduce a sense of discomfort in an image in which a virtual-space image is superimposed on a real-space image (without taking labor, for example, without performing special photographing or color measurement).

Note that an example in which a first white-balance correction value corresponding (approximating) to a white-balance correction value applied to a background image (a white-balance correction value applied to the background image after AWB processing) is determined on the basis of the background image before the AWB processing is described above. However, a method for acquiring a first white-balance correction value is not limited to this. For example, an HMD may output a white-balance correction value used in AWB correction, and an information processing device may acquire the white-balance correction value output from the HMD as a first white-balance correction value. The HMD may output another information on a white-balance correction value used in AWB processing, and the information processing device may acquire (determine) a first white-balance correction value on the basis of the information output from the HMD. The HMD may not apply a white-balance correction value to a background image, but the information processing device may determine a first white-balance correction value and apply the determined first white-balance correction value to the background image (background image to which the white-balance correction value is not applied).

Second Embodiment

A second embodiment of the present invention will be described. Note that the descriptions of the same points as those of the first embodiment (for example, the same configurations and processing as those of the first embodiment) will be omitted, and a point different from that of the first embodiment will be described below.

In the second embodiment, an information processing device 100 (CG-image correction unit 106) acquires position information showing a position at which a CG image is superimposed, and acquires (determines and calculates) a first white-balance correction value on the basis of the position information and a background image before AWB processing. By the consideration of the position of a CG image, it is possible to acquire suitable white-balance correction values (a first white-balance correction value and a second white-balance correction value) even in a case in which a background image includes a plurality of regions corresponding to a plurality of environment light-sources, respectively. For example, it is possible to acquire a first white-balance correction value closer to a white-balance correction value applied to a part of a background image (a region including a position at which a CG image is superimposed or a region in which the CG image is superimposed) in AWB processing.

FIG. 8 is a flowchart showing the processing flow of a CG-image correction unit 106 in the second embodiment.

In step S801, the CG-image correction unit 106 acquires a background image (background image before AWB processing) captured by an imaging element 202 from a system control unit 205 of an imaging unit 111.

In step S802, the CG-image correction unit 106 acquires position information showing a position at which a CG image is superimposed from a CG-image generation unit 105.

In step S803, the CG-image correction unit 106 determines (acquires) a first white-balance correction value on the basis of the background image (background image before AWB processing) acquired in step S801 and the position information acquired in step S802. In the first embodiment, a first white-balance correction value is determined on the basis of an entire background image before AWB processing. In the second embodiment, a first white-balance correction value is determined on the basis of an image of a region including a position shown by position information (a position at which a CG image is superimposed) in the background image before AWB processing.

Figure 9:
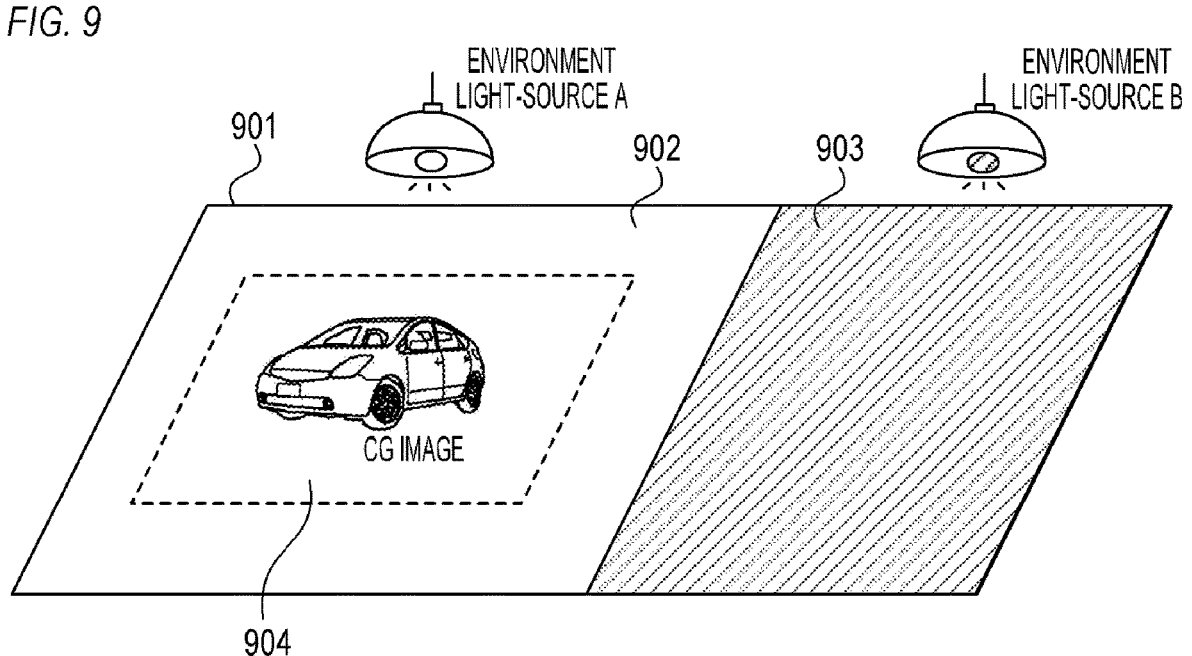
FIG. 9 is a diagram showing a background image.

FIG. 9 shows a background image 901. The background image 901 includes a region 902 corresponding to an environment light-source A and a region 903 corresponding to an environment light-source B. A CG image is superimposed on the region 902 corresponding to the environment light-source A. When a first white-balance correction value is determined on the basis of the region 903 corresponding to the environment light-source B at this time, it is not possible to determine a first white-balance correction value close to a white-balance correction value used near the CG image in AWB processing. Therefore, in the second embodiment, the first white-balance correction value is determined on the basis of a region 904 (a part of the region 902 corresponding to the environment light-source A) including a position at which the CG image is superimposed. Thus, it is possible to determine the first white-balance correction value close to the white-balance correction value used near the CG image in the AWB processing.

The processing of steps S804 to S807 is the same as that of steps S303 to S306 of the first embodiment (FIG. 3).

As described above, a first white-balance correction value is determined on the basis of an image of a region including a position at which a CG image is superimposed according to the second embodiment. Thus, it is possible to acquire suitable white-balance correction values (a first white-balance correction value and a second white-balance correction value) even in a case in which a background image includes a plurality of regions corresponding to a plurality of environment light-sources, respectively.

Note that a method for setting a region including a position at which a CG image is superimposed is not particularly limited. For example, a region of a predetermined size about a position at which a CG image is superimposed may be set. Alternatively, after dividing a background image into a plurality of regions (for example, a plurality of regions corresponding to a plurality of environment light-sources, respectively), a region including a position at which a CG image is superimposed may be selected from the plurality of regions.

Further, the CG-image correction unit 106 may acquire region information showing a region in which a CG image is superimposed. Then, the CG-image correction unit 106 may determine a first white-balance correction value on the basis of an image of the region in which the CG image is superimposed. The CG-image correction unit 106 may determine the first white-balance correction value on the basis of an image of a region including the region in which the CG image is superimposed (for example, a region slightly larger than the region in which the CG image is superimposed).

Note that the embodiments (including the modified examples) described above are given only as examples. Configurations obtained by appropriately deforming or modifying the configurations described above within the gist of the present invention are also included in the present invention. Configurations obtained by appropriately combining the configurations described above together are also included in the present invention.

According to the present invention, it is possible to simply and easily reduce a sense of discomfort in an image in which a virtual-space image is superimposed on a real-space image (without taking labor, for example, without performing special photographing or color measurement).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-119707, filed on Jul. 27, 2022, which is hereby incorporated by reference herein in its entirety.

What is claimed is:

1. An information processing device comprising:
one or more processors and/or circuitry, the one or more processors and/or circuitry being configured to:
(1) execute acquisition processing of acquiring a first white-balance correction value corresponding to a white-balance correction value to be applied to a real-space image;
(2) execute determination processing of determining, on a basis of the first white-balance correction value, a second white-balance correction value that is a white-balance correction value to be applied to a virtual-space image;
(3) execute correction processing of correcting the virtual-space image on a basis of the second white-balance correction value; and
(4) execute superimposing processing of superimposing, on the real-space image, a virtual-space image after the correction processing,
wherein in the acquisition processing, a third white-balance correction value is determined on a basis of the real-space image before application of the white-balance correction value corresponding to the first white-balance correction value, the third white-balance correction value corresponding to a color temperature of an environment light-source and corresponding to a white-balance correction value for displaying an object of a predetermined color in the predetermined color, and
wherein in the determination processing, the second white-balance correction value is determined by multiplying a predetermined coefficient by a ratio of the first white-balance correction value to the third white-balance correction value.

2. The information processing device according to claim 1, wherein in the acquisition processing, the first white-balance correction value is determined on a basis of a real-space image before application of the white-balance correction value corresponding to the first white-balance correction value.

3. The information processing device according to claim 1, wherein in the acquisition processing, the first white-balance correction value is determined on a basis of an image of a region including a position at which the virtual-space image is to be superimposed in the real-space image before application of the white-balance correction value corresponding to the first white-balance correction value.

4. The information processing device according to claim 1, wherein in the acquisition processing, the first white-balance correction value is determined on a basis of an image of a region in which the virtual-space image is superimposed in the real-space image before application of the white-balance correction value corresponding to the first white-balance correction value.

5. The information processing device according to claim 1, wherein the color temperature of the environment light-source is estimated in a determination process of the first white-balance correction value.

6. The information processing device according to claim 1, wherein in the acquisition processing, the third white-balance correction value is adjusted on a basis of the color temperature of the environment light-source to determine the first white-balance correction value corresponding to a white-balance correction value for displaying the object in a color perceived by a human.

7. The information processing device according to claim 1, wherein the one or more processors and/or circuitry further executes second determination processing of determining whether an environment of a real space has changed, and wherein in the correction processing, the second white-balance correction value to be used is updated on a basis of a determination result of the second determination processing.

8. The information processing device according to claim 7, wherein in the correction processing, the second white-balance correction value to be used is updated in a case where it is determined that the environment of the real space has changed.

9. The information processing device according to claim 7, wherein in the correction processing, the second white-balance correction value to be used is not updated in a case where it is determined that the environment of the real space has not changed.

10. The information processing device according to claim 7, wherein in the correction processing, the second white-balance correction value to be used is gradually changed when updating the second white-balance correction value to be used.

11. A head-mounted display device comprising:
the information processing device according to claim 1; and
a display configured to display an image obtained by the superimposing processing.

12. The information processing device according to claim 1, wherein the first white-balance correction value, the second white-balance correction value, and the third white-balance correction value are acquired without using a colorimeter.

13. A control method of an information processing device, the control method comprising:
acquiring a first white-balance correction value corresponding to a white-balance correction value to be applied to a real-space image;
determining, on a basis of the first white-balance correction value, a second white-balance correction value that is a white-balance correction value to be applied to a virtual-space image;
determining a third white-balance correction value on a basis of the real-space image before application of the white-balance correction value corresponding to the first white-balance correction value, the third white-balance correction value corresponding to a color temperature of an environment light-source and corresponding to a white-balance correction value for displaying an object of a predetermined color in the predetermined color;
correcting the virtual-space image on a basis of the second white-balance correction value; and
superimposing, on the real-space image, a virtual-space image after the correcting,
wherein the second white-balance correction value is determined by multiplying a predetermined coefficient by a ratio of the first white-balance correction value to the third white-balance correction value.

14. A non-transitory computer-readable medium that stores a program, wherein the program causes a computer to execute a control method of an information processing device, the control method comprising:
acquiring a first white-balance correction value corresponding to a white-balance correction value to be applied to a real-space image;
determining, on a basis of the first white-balance correction value, a second white-balance correction value that is a white-balance correction value to be applied to a virtual-space image;
determining a third white-balance correction value on a basis of the real-space image before application of the white-balance correction value corresponding to the first white-balance correction value, the third white-balance correction value corresponding to a color temperature of an environment light-source and corresponding to a white-balance correction value for displaying an object of a predetermined color in the predetermined color;
correcting the virtual-space image on a basis of the second white-balance correction value; and
superimposing, on the real-space image, a virtual-space image after the correcting,
wherein the second white-balance correction value is determined by multiplying a predetermined coefficient by a ratio of the first white-balance correction value to the third white-balance correction value.

* * * * *